US012350714B2

(12) United States Patent
Chen

(10) Patent No.: US 12,350,714 B2
(45) Date of Patent: Jul. 8, 2025

(54) SCREW DETECTION DEVICE

(71) Applicant: Sin Jin Intelligent Technology Co., Ltd, Kaohsiung (TW)

(72) Inventor: Ying-Nan Chen, Kaohsiung (TW)

(73) Assignee: SIN JIN INTELLIGENT TECHNOLOGY CO., LTD, Kaohsiung (TW)

( * ) Notice: Subject to any disclaimer, the term of this patent is extended or adjusted under 35 U.S.C. 154(b) by 36 days.

(21) Appl. No.: 18/470,681

(22) Filed: Sep. 20, 2023

(65) Prior Publication Data

US 2025/0091091 A1 Mar. 20, 2025

(51) Int. Cl.
*B07C 5/34* (2006.01)
*B07C 5/342* (2006.01)
*B07C 5/36* (2006.01)

(52) U.S. Cl.
CPC ............ *B07C 5/3422* (2013.01); *B07C 5/365* (2013.01); *B07C 2501/0009* (2013.01)

(58) Field of Classification Search
CPC .................. B07C 5/3422; B07C 5/365; B07C 2501/0009
USPC ......................................... 209/586, 644, 929
See application file for complete search history.

(56) References Cited

U.S. PATENT DOCUMENTS 3,743,091 A * 7/1973 Fowlkes .................. B07C 5/04 209/652
11,196,967 B1 * 12/2021 Lee ........................ H04N 23/55
2005/0257599 A1 11/2005 Kuo

FOREIGN PATENT DOCUMENTS

| | | | |
|---|---|---|---|
| CN | 207929596 | U | 10/2018 |
| CN | 112330584 | A | 2/2021 |
| CN | 213179866 | U | 5/2021 |
| JP | S62239008 | A | 10/1987 |
| JP | H0971310 | A | 3/1997 |
| JP | 2016102717 | A | 6/2016 |
| JP | 7041200 | B2 | 3/2022 |

(Continued)

OTHER PUBLICATIONS

CN213179866 with English translation; Inv: Wu; Pub. Date: May 2021 (Year: 2021).*

*Primary Examiner* — Joseph C Rodriguez
(74) *Attorney, Agent, or Firm* — MUNCY, GEISSLER, OLDS & LOWE, P.C.

(57) ABSTRACT

A screw detection device is configured to detect screws and has a device base with a controlling module, a carrying mechanism, a top visual-detection mechanism and a lateral visual-detection mechanism mounted inside. A screw is fed into the device base and is carried on two guide-rail assemblies of a carrying rail of the carrying mechanism. A top visual-detection camera of the top visual-detection mechanism and a lateral visual-detection camera of the lateral visual-detection mechanism take photographs of the screw on the carrying rail. The controlling module determines whether the screw is defective based on the photographs and controls a classifying assembly to discard a defective screw. The controlling module automatically controls the carrying rail, the top visual-detection camera and the lateral visual-detection camera, letting the screw detection device meet different-size screws' detection needs. Therefore, manual adjustments are unnecessary, reducing adjusting time and reducing errors from adjusting the device.

12 Claims, 16 Drawing Sheets

(56) References Cited

FOREIGN PATENT DOCUMENTS

| | | | |
|---|---|---|---|
| KR | 101478824 | B1 | 1/2015 |
| TW | 201800742 | A | 1/2018 |

* cited by examiner

SCREW DETECTION DEVICE

BACKGROUND OF THE INVENTION

1. Field of the Invention

The present invention relates to a device configured to detect screws, especially to a device with a linear carrying rail, which is used to carry screws, and automatically controlling and adjusting mechanisms through a controlling module to detect screws of different sizes.

2. Description of Related Art

In screw production industry, to reduce labor costs and lower a detection error rate, a screw detection device is used to detect screws nowadays. The screw detection device comprises multiple detection cameras and a rotary disk. The rotary disk has multiple detection recesses. The multiple detection cameras are disposed around and face the rotary disk to photograph. The screw detection device rotates the rotary disk.

While processing screw detection, a screw-feeding device feeds multiple screws to the rotary disk and puts each of the screws into a respective one of the multiple detection recesses. The screw detection device rotates the rotary disk to move the screws to pass through the front of the multiple detection cameras. By the multiple detection cameras photographing each screw, the screw detection device detects and determines whether said screw is defective.

A screw factory often produces screws of different sizes. Corresponding to screws of different sizes, detection recesses in a rotary disk also have different sizes. So, to detect screws of different sizes, the rotary disk in the screw detection device needs to be changed. This is less convenient, and also the multiple detection cameras of the screw detection device have to be refocused, and changing the rotary disk and refocusing the multiple detection cameras are manually operated. However, manual adjustments are prone to errors, hence increasing the detection error rate and product defect rate, and therefore it is hard to tell whether a defective product is caused by errors of a detection device or by errors of production, and therefore improvements are still needed.

SUMMARY OF THE INVENTION

The main objective of the present invention is to provide a screw detection device to resolve drawbacks that a detection device nowadays needs to change rotary disks and refocus detection cameras manually, hence being inconvenient, increasing a detection error rate and a product defect rate, and causes of a defective product are hard to tell.

The screw detection device comprises a device base, a carrying mechanism, a top visual-detection mechanism and a lateral visual-detection mechanism. The device base has an installing plate and a controlling module mounted inside the device base. The device base comprises a classifying assembly mounted on the installing plate. The controlling module is electrically connected to the classifying assembly. The carrying mechanism is mounted on the installing plate and comprises a carrying rail, a space-adjusting assembly and a conveyance assembly. The carrying rail has two guide-rail assemblies extending along a linear direction and arranged parallelly. The space-adjusting assembly is connected to the two guide-rail assemblies and drives the two guide-rail assemblies toward or away from each other. The conveyance assembly cooperates with the carrying rail to move a screw on the two guide-rail assemblies along the linear direction toward the classifying assembly. The controlling module is electrically connected to and controls the space-adjusting assembly and the conveyance assembly. The top visual-detection mechanism is mounted on the installing plate and comprises a top visual-detection camera and a top focal-length-controlling assembly. The top visual-detection camera is disposed over the carrying rail and faces toward the carrying rail. The top focal-length-controlling assembly is connected to the top visual-detection camera, is electrically connected to and controlled by the controlling module, and can adjust a focal length of the top visual-detection camera. The lateral visual-detection mechanism is mounted on the installing plate and comprises a lateral visual-detection camera and a lateral focal-length-controlling assembly. The lateral visual-detection camera is disposed at a side of the carrying rail and faces toward the carrying rail. The lateral focal-length-controlling assembly is connected to the lateral visual-detection camera, is electrically connected to and controlled by the controlling module, and can adjust a focal length of the lateral visual-detection camera. The controlling module is electrically connected to the top visual-detection camera and the lateral visual-detection camera and controls the top visual-detection camera and the lateral visual-detection camera to photograph the screw, so that the controlling module determines whether the screw is defective and discards a defective screw through the classifying assembly.

The screw detection device is configured to detect screws. A screw-feeding device feeds several screws onto the two guide-rail assemblies of the carrying rail of the carrying mechanism and lets the screws extend to be between the two guide-rail assemblies. The conveyance assembly drives the screws moving forward along the linear direction. When passing through the top visual-detection camera of the top visual-detection mechanism and passing through the lateral visual-detection camera of the lateral visual-detection mechanism, each one of the screws is photographed. The controlling module of the screw detection device detects and determines whether the screw is defective, and discards a defective screw through the classifying assembly.

In addition, the screw detection device has the following advantages:

1. Reducing errors: When using the screw detection device to detect screws of different sizes, by presetting the adjusting parameters of the controlling module, the controlling module controls the space-adjusting assembly to move the two guide-rail assemblies toward and away from each other, thereby adjusting a distance between the two guide-rail assemblies to correspond to the screws of different sizes. The controlling module controls the top focal-length-controlling assembly to adjust the focal length of the top visual-detection camera, and controls the lateral focal-length-controlling assembly to adjust the focal length of the lateral visual-detection camera, thereby letting the screw detection device automatically adjust to meet detection needs of screws of different sizes. Therefore, manual adjustments are unnecessary, increasing convenience and reducing time spent on adjustments, and effectively reducing errors caused by adjusting device, hence increasing detection accuracy.

2. Increasing detection amount: A conventional screw detection device uses a rotary disk to carry to-be-detected screws, so the screw-feeding device feeds screws onto the rotating rotary disk. However, due to an effect of centrifugal force, a rotational speed of the rotary disk is limited. On the other hand, because the two guide-rail assemblies of the carrying rail of the carrying mechanism are linear, the conveyance assembly of the carrying mechanism moves screws on the two guide-rail assemblies along the linear direction to process detection. So, compared to the conventional screw detection device, the screw detection device in accordance with the present invention does not need to consider the effect of centrifugal device, and hence a feeding speed of the screw-feeding device can be increased, thereby increasing the detection amount.

3. Lowering costs: As mentioned above, the distance between the two guide-rail assemblies can be adjusted through the space-adjusting assembly. Therefore, the carrying rail corresponds to screws of different sizes and rotary disks of different sizes are unnecessary to be prepared, and hence lowering the costs.

DETAILED DESCRIPTION OF THE PREFERRED EMBODIMENT

Figure 1:
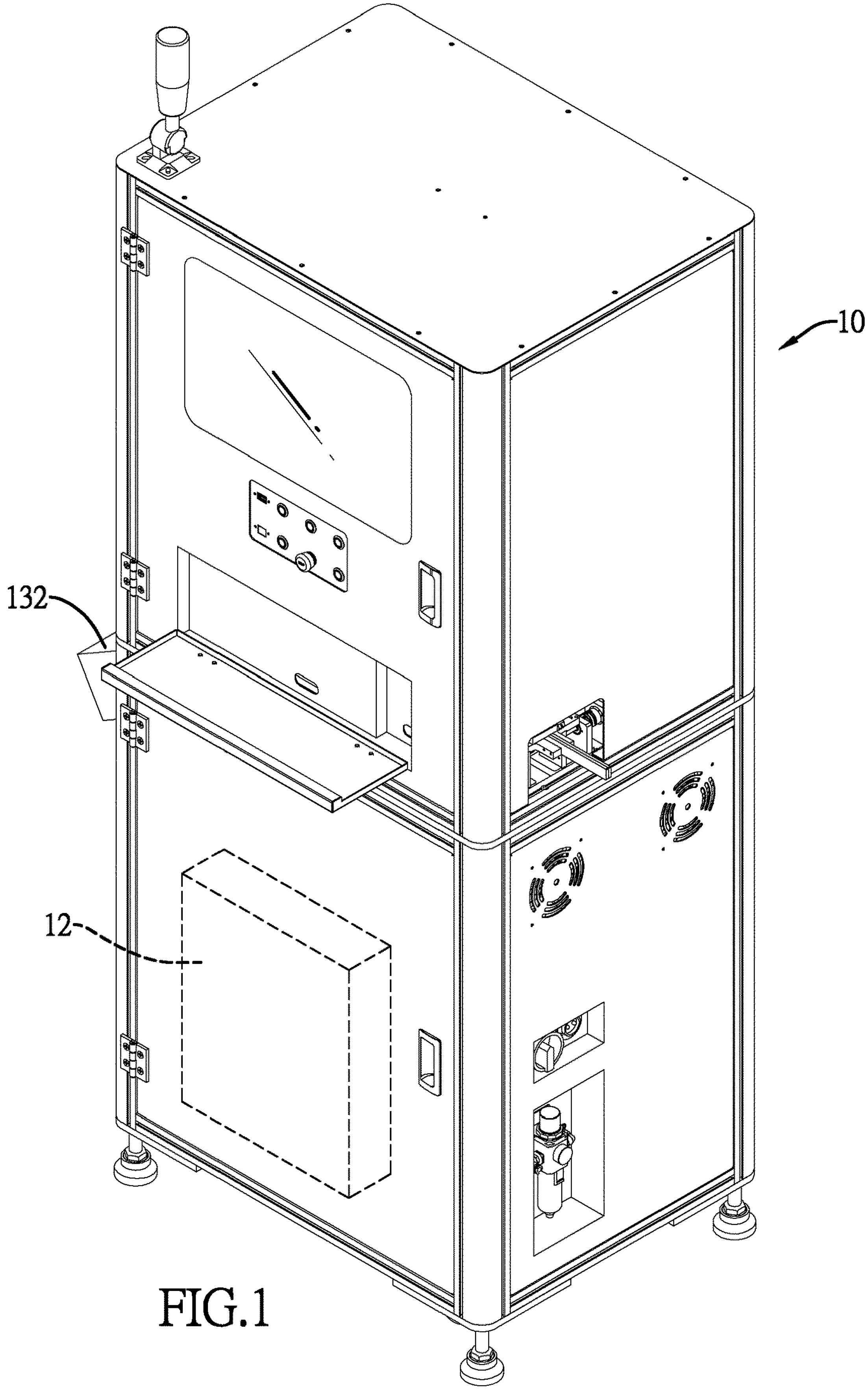
FIG. 1 is a perspective view of a screw detection device in accordance with the present invention.
Figure 2:
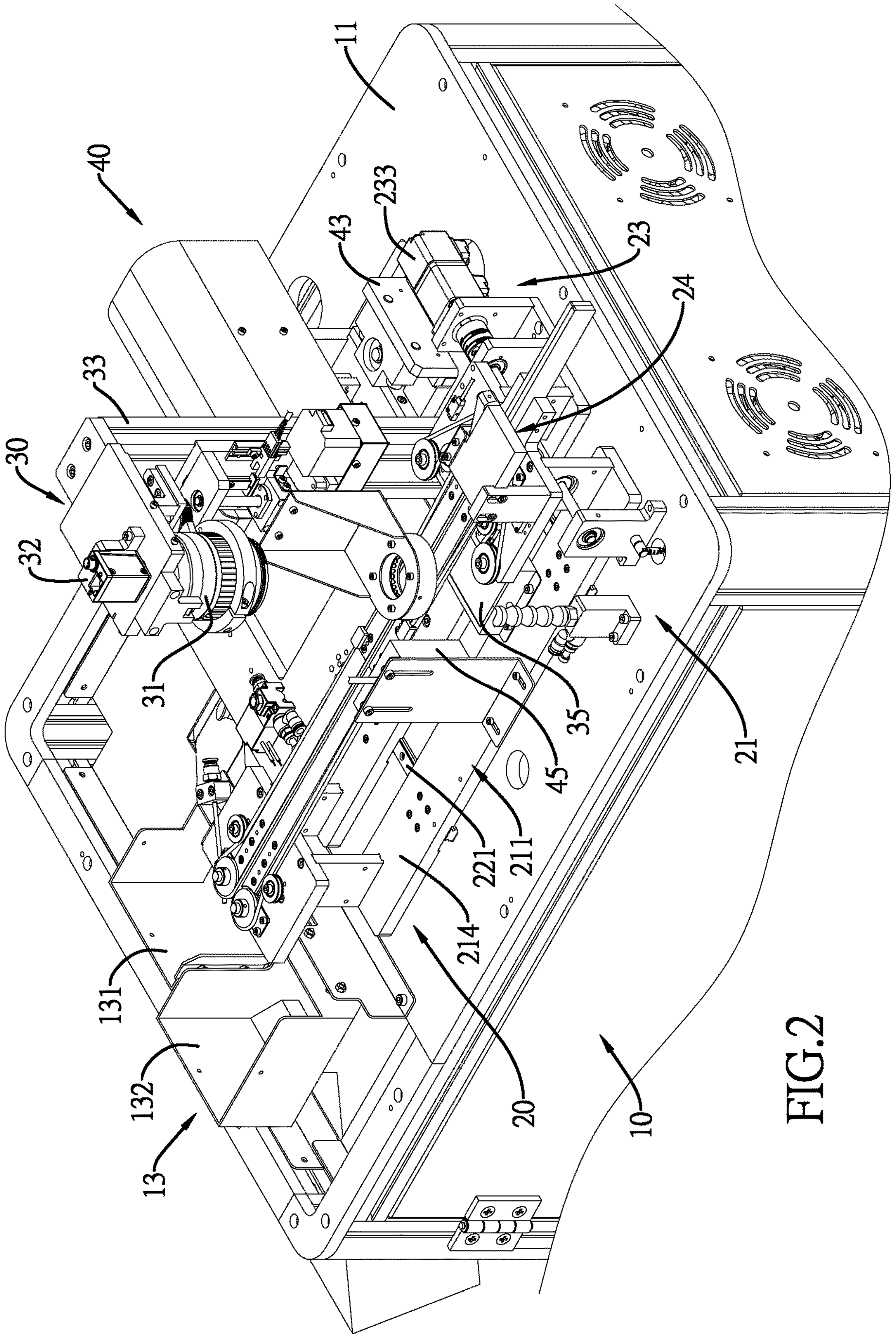
FIG. 2 is a perspective view of an interior of a device base of the screw detection device in accordance with the present invention.
Figure 3:
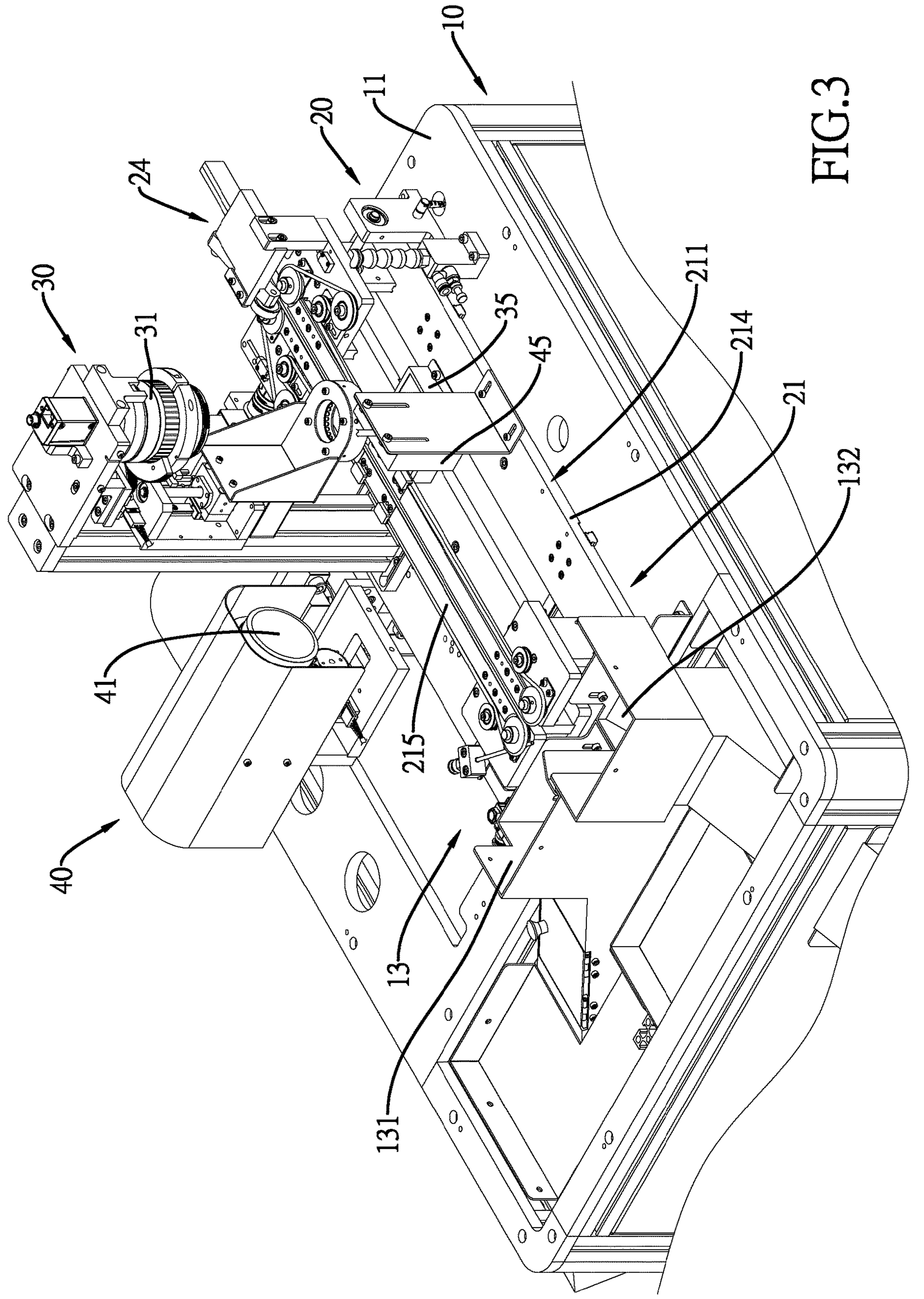
FIG. 3 is another perspective view of the interior of the device base of the screw detection device in accordance with the present invention.

With reference to FIGS. 1 to 3, a screw detection device in accordance with the present invention comprises a device base 10, a carrying mechanism 20, a top visual-detection mechanism 30 and a lateral visual-detection mechanism 40.

With reference to FIGS. 1 to 3, the device base 10 has an installing plate 11 and a controlling module 12, which is mounted inside the device base 10. The device base 10 comprises a classifying assembly 13 mounted on the installing plate 11. The controlling module 12 is electrically connected to the classifying assembly 13.

Figure 12:
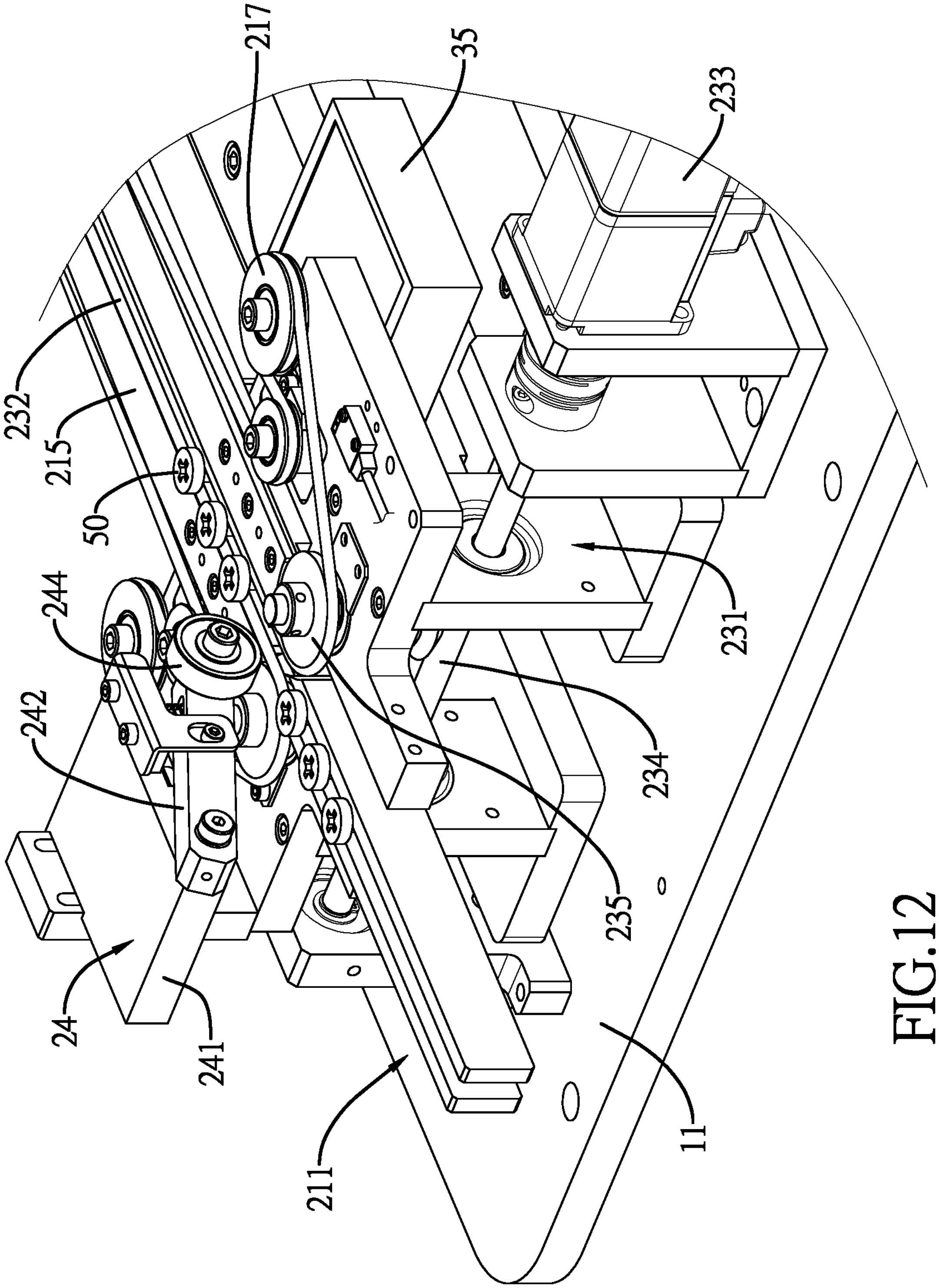
FIG. 12 is a perspective view of a pressing assembly of the screw detection device in accordance with the present invention.
Figure 13:
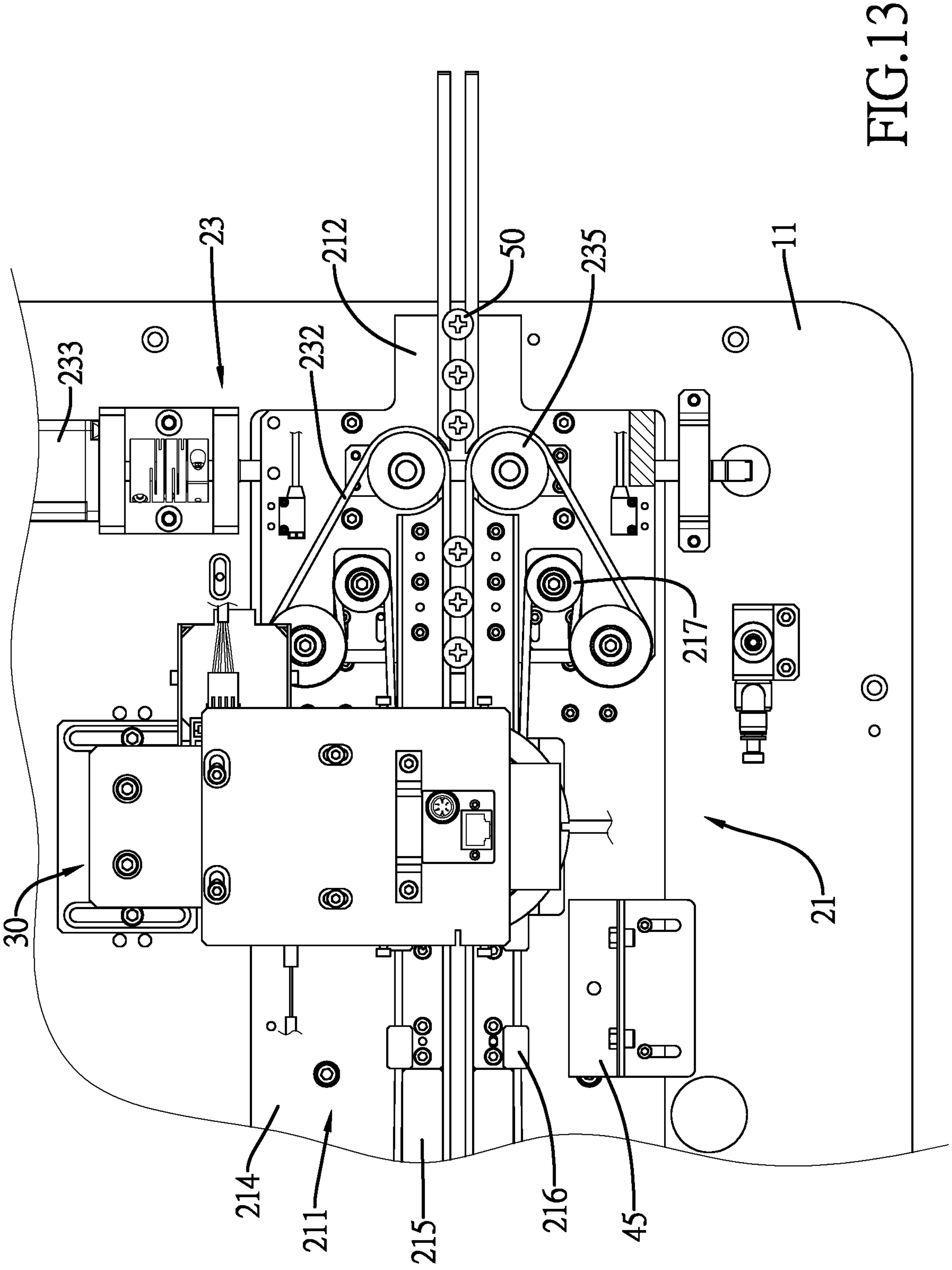
FIG. 13 is a top view of a feeding end and a detecting area of the carrying mechanism of the screw detection device in accordance with the present invention.
Figure 14:
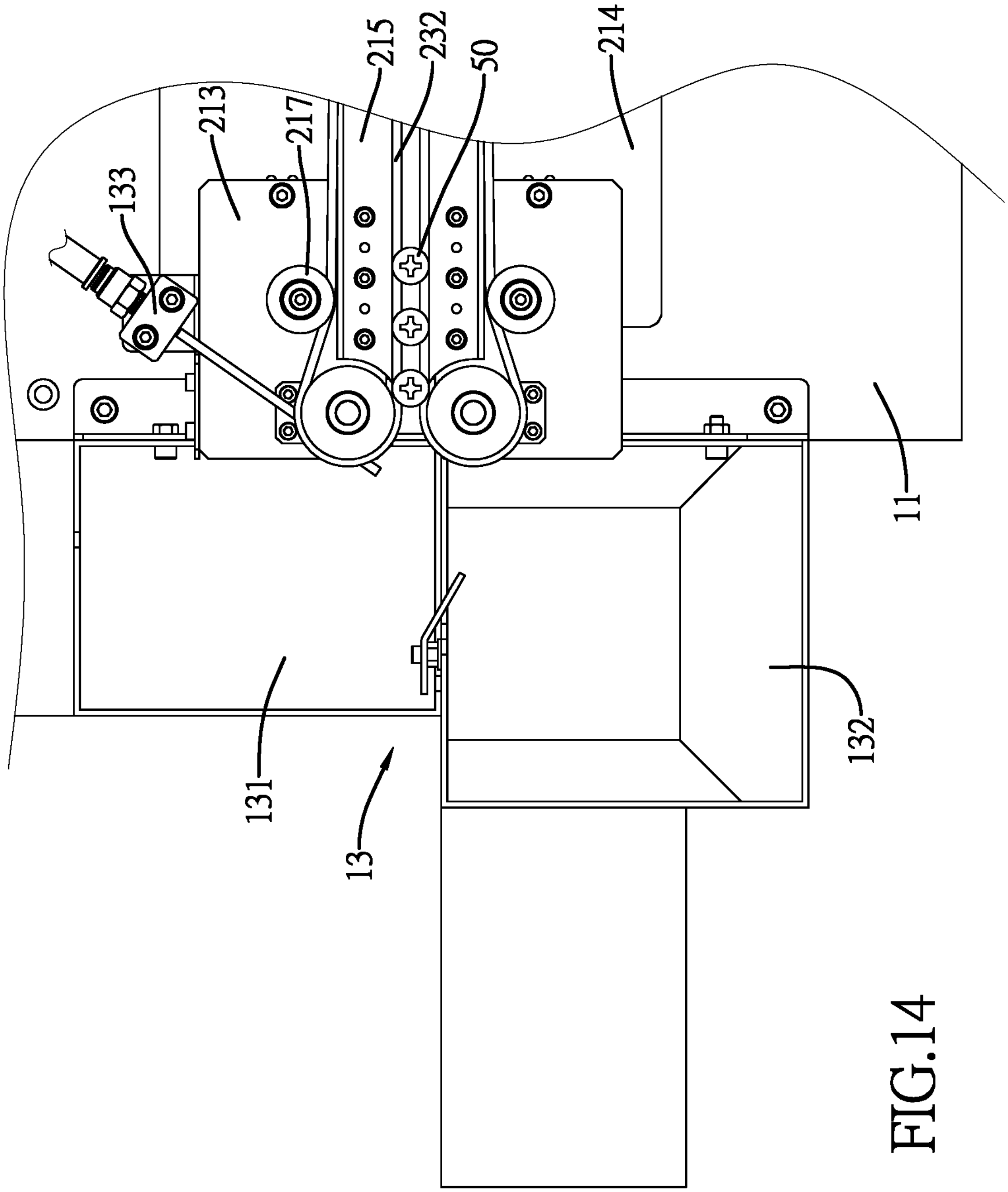
FIG. 14 is a top view of a discharging end of the carrying mechanism of the screw detection device in accordance with the present invention.

With reference to FIGS. 2 to 5, the carrying mechanism 20 is mounted on the installing plate 11 and comprises a carrying rail 21, a space-adjusting assembly 22 and a conveyance assembly 23. The carrying rail 21 has two guide-rail assemblies 211 extending along a linear direction and arranged parallelly. The space-adjusting assembly 22 is connected to the two guide-rail assemblies 211 and drives the two guide-rail assemblies 211 toward or away from each other. With reference to FIGS. 12 to 14, the conveyance assembly 23 cooperates with the carrying rail 21 to move a screw 50 on the two guide-rail assemblies 211 along the linear direction toward the classifying assembly 13. The controlling module 12 is electrically connected to and controls the space-adjusting assembly 22 and the conveyance assembly 23.

With reference to FIGS. 2 to 8, the top visual-detection mechanism 30 is mounted on the installing plate 11 and comprises a top visual-detection camera 31 and a top focal-length-controlling assembly 32. The top visual-detection camera 31 is disposed over the carrying rail 21 and faces toward the carrying rail 21. The top focal-length-controlling assembly 32 is connected to the top visual-detection camera 31, is electrically connected to and controlled by the controlling module 12, and can adjust a focal length of the top visual-detection camera 31.

With reference to FIGS. 2 to 6, 9 and 10, the lateral visual-detection mechanism 40 is mounted on the installing plate 11 and comprises a lateral visual-detection camera 41 and a lateral focal-length-controlling assembly 42. The lateral visual-detection camera 41 is disposed at a side of the carrying rail 21 and faces toward the carrying rail 21. The lateral focal-length-controlling assembly 42 is connected to the lateral visual-detection camera 41, is electrically connected to and controlled by the controlling module 12, and can adjust a focal length of the lateral visual-detection camera 41. In addition, the controlling module 12 is electrically connected to the top visual-detection camera 31 and the lateral visual-detection camera 41 and controls the top visual-detection camera 31 and the lateral visual-detection camera 41 to photograph the screw 50, so that the controlling module 12 determines whether the screw 50 is defective and discards a defective screw through the classifying assembly 13.

Figure 15:
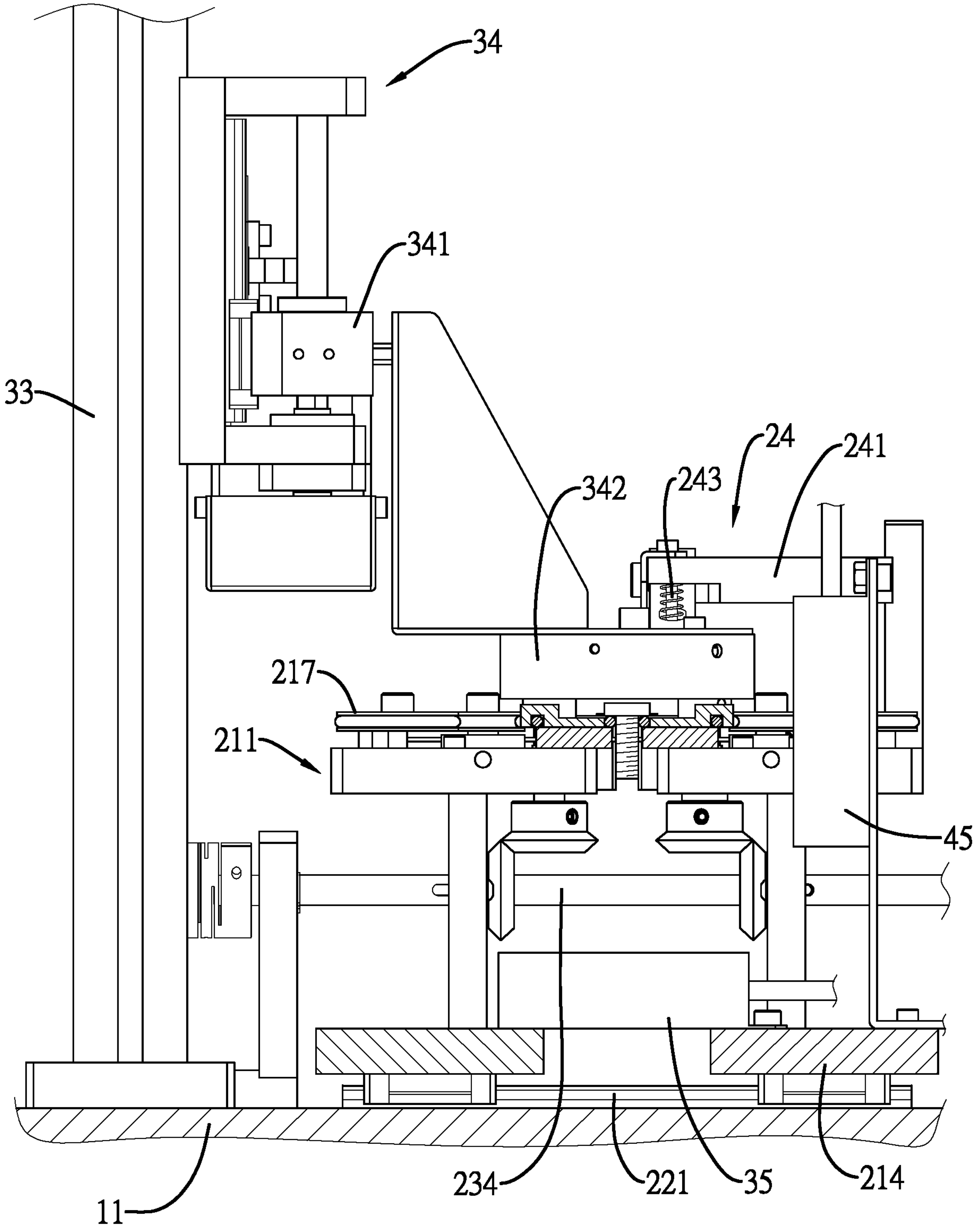
FIG. 15 is a side view of the carrying mechanism of the screw detection device in accordance with the present invention.

With reference to FIGS. 13 to 15, the screw detection device is configured to detect screws 50. A screw-feeding device feeds several screws 50 onto the two guide-rail assemblies 211 of the carrying rail 21 of the carrying mechanism 20 and lets the screws 50 extend to be between the two guide-rail assemblies 211. The conveyance assembly 23 drives the screws 50 to move forward along the linear direction. When passing through the top visual-detection camera 31 of the top visual-detection mechanism 30 and passing through the lateral visual-detection camera 41 of the lateral visual-detection mechanism 40, each one of the screws 50 is photographed. Then the controlling module 12 of the screw detection device detects and determines whether a screw 50 is defective.

Figure 4:
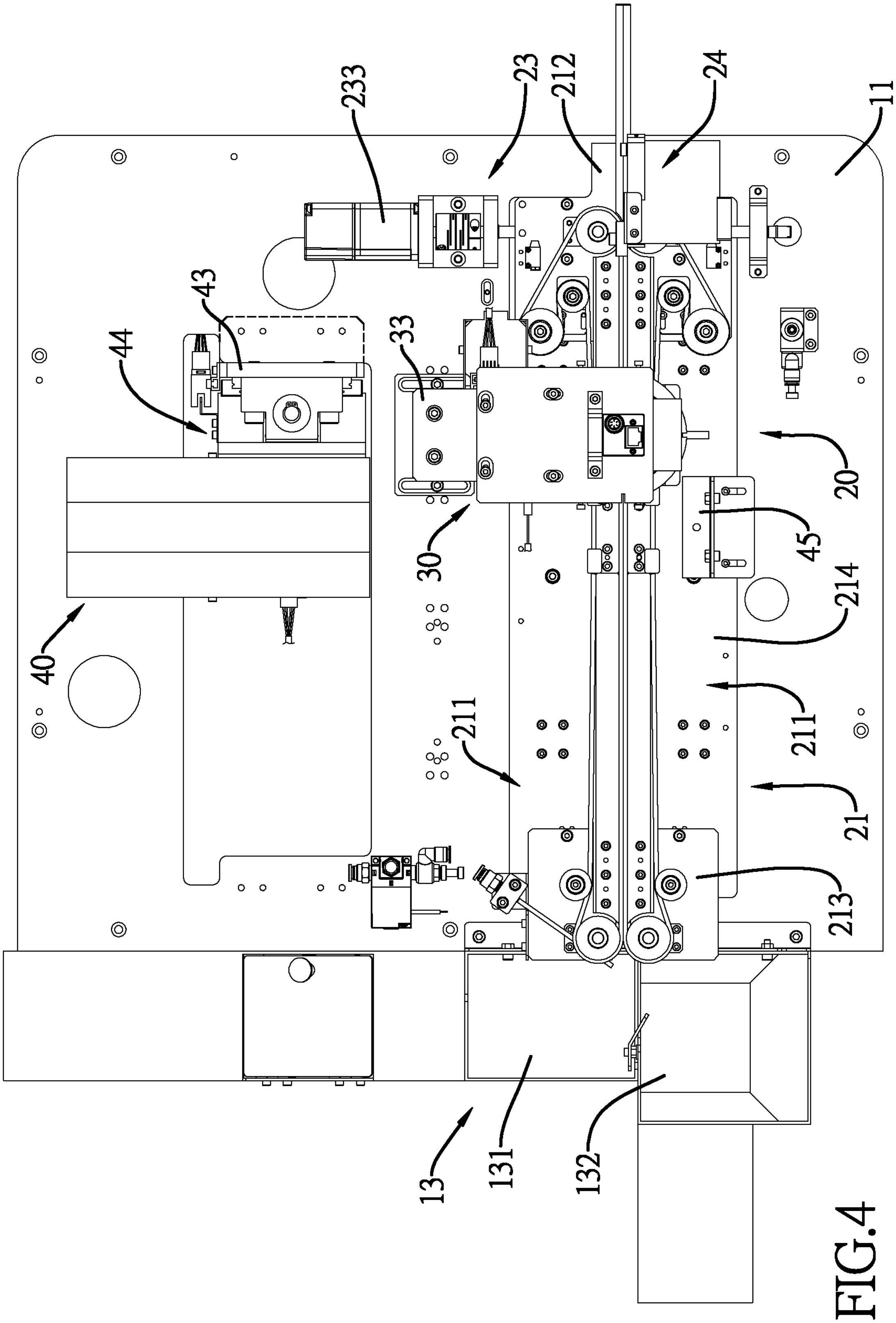
FIG. 4 is a top view of the interior of the device base of the screw detection device in accordance with the present invention.
Figure 5:
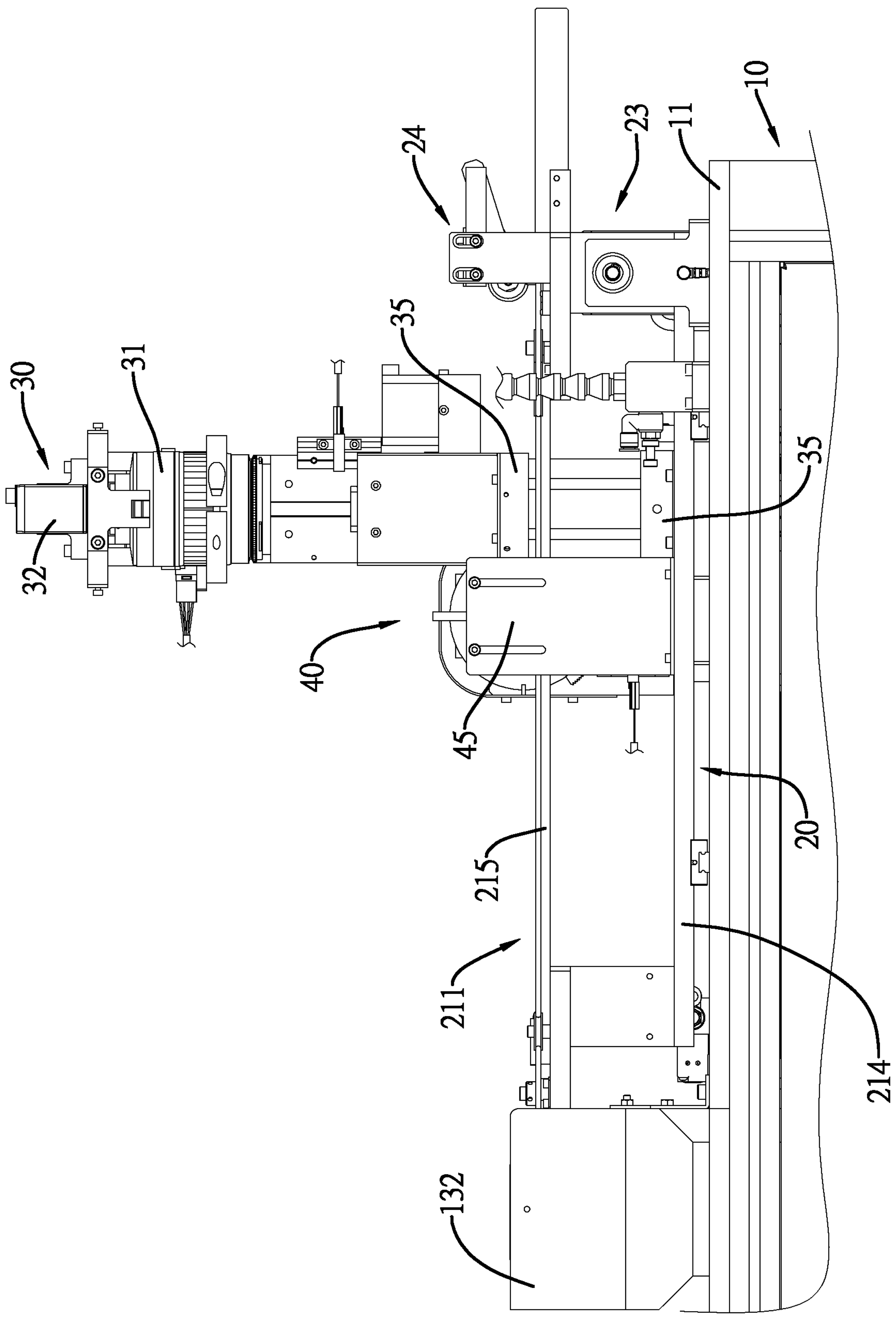
FIG. 5 is a front view of the interior of the device base of the screw detection device in accordance with the present invention.

With reference to FIGS. 4, 13 and 14, two ends of the carrying rail 21 are respectively defined as a feeding end 212 and a discharging end 213. The carrying rail 21 has a detecting area defined between the feeding end 212 and the discharging end 213. The screw 50 is fed into the carrying rail 21 through the feeding end 212 and is discharged from the discharging end 213. The classifying assembly 13 is adjacent to the discharging end 213. The top visual-detection camera 31 and the lateral visual-detection camera 41 respectively face toward the detecting area of the carrying rail 21.

With reference to FIGS. 2, 4, 12 and 13, the conveyance assembly 23 comprises a conveyance driving set 231 and two conveyance belts 232. The conveyance driving set 231 comprises a conveyance driving element 233, a conveyance link component 234 and two driving wheels 235. The conveyance driving element 233 is mounted at the installing plate 11 and is electrically connected to and controlled by the controlling module 12. The conveyance driving element 233 is connected to the conveyance link component 234. The two driving wheels 235 are connected to the conveyance link component 234 and respectively correspond to the two guide-rail assemblies 211. The two conveyance belts 232 are respectively mounted around the two driving wheels 235 and the two guide-rail assemblies 211. The conveyance driving set 231 drives the two conveyance belts 232 to operate. The conveyance driving element 233 is preferably a motor.

In addition, with reference to FIGS. 13 to 16, each one of the two guide-rail assemblies 211 comprises a guide-rail seat 214 and a guide-rail element 215. The guide-rail element 215 is mounted on the guide-rail seat 214. Each one of the two driving wheels 235 is mounted on the guide-rail seat 214 of the corresponding guide-rail assembly 211. Each one of the two conveyance belts is mounted around the guide-rail element 215 of the corresponding guide-rail assembly 211. Each one of the two guide-rail assemblies 211 comprises multiple position-limited pieces 216 and multiple guiding wheels 217. The multiple position-limited pieces 216 are mounted at the guide-rail element 215 of said guide-rail assembly 211 to limit the conveyance belt 232 corresponding to the said guide-rail assembly 211 in position. The multiple guiding wheels 217 are adjustably mounted at the guide-rail seat 214 and are disposed at two ends of the guide-rail element 215 of said guide-rail assembly 211. Each one of the two conveyance belts 232 is mounted around the multiple guiding wheels 217 of the corresponding guide-rail assembly 211. The multiple guiding wheels 217 abut the corresponding conveyance belt 232.

Besides, as shown in FIGS. 12 and 15, the carrying mechanism 20 comprises a pressing assembly 24 disposed at the feeding end 212 of the carrying mechanism 20. The pressing assembly 24 comprises a pressing seat 241, a pressing arm 242 and an elastic element 243. The pressing seat 241 is mounted at the carrying rail 21. One end of the pressing arm 242 is swingably mounted at the pressing seat 241, and another end of the pressing arm 242 is disposed over the two guide-rail assemblies 211 and has a pressing wheel 244. The elastic element 243 is mounted between and abuts the pressing seat 241 and the pressing arm 242. When the screw-feeding device feeds the screw 50 into the feeding end 212 of the carrying rail 21, a screw head of the screw 50 passes through a bottom side of the pressing wheel 244, and an elastic force of the elastic element 243 makes the pressing wheel 244 abut the screw head of the screw 50, so the screw 50 is stably delivered into the carrying rail 21.

Figure 16:
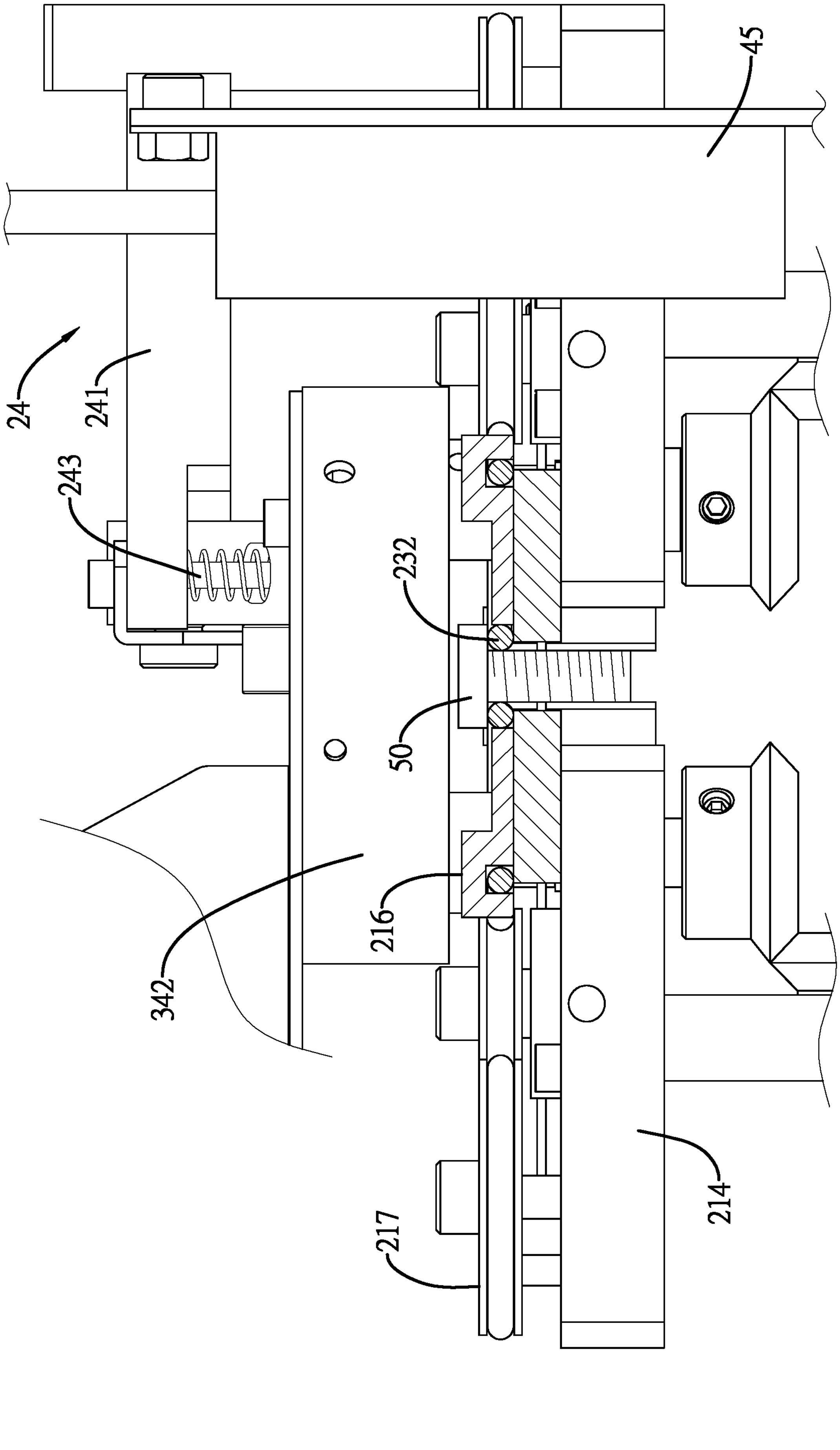
FIG. 16 is a partially-enlarged side view of the carrying mechanism of the screw detection device in accordance with the present invention.

As shown in FIGS. 15 and 16, the screw head of the screw 50 is carried on the two conveyance belts 232 and a thread segment of the screw 50 is in a space between the two guide-rail elements 215. The controlling module 12 controls the conveyance driving element 233 of the conveyance driving set 231 of the conveyance assembly 23 to operate. By the conveyance link component driving the two driving wheels 235 to rotate, the two driving wheels 235 respectively move the conveyance belts 232 on the two corresponding guide-rail assemblies 211, so the screw 50 is moved from the feeding end 212 of the carrying rail 21 toward the discharging end 213 along the linear direction. Additionally, in each one of the two guide-rail assemblies 211, by the multiple position-limited pieces 216 limiting the corresponding conveyance belt 232 at the guide-rail element 215 in position, and by the multiple guiding wheels 217 being adjustable to abut the said conveyance belt 232, a tension of the said conveyance belt 232 is increased, and loosening of the said conveyance belt 232 is prevented, hence increasing a moving stability of the said conveyance belt 232.

When the screw 50 is moved to the detecting area and passes under the top visual-detection camera 31, the top visual-detection camera 31 photographs the screw 50 to take a photograph of the screw head of the screw 50. When the screw 50 is moved and passes in front of the lateral visual-detection camera 41, the lateral visual-detection camera 41 photographs the screw 50 to take a photograph of the thread segment of the screw 50. Then the top visual-detection camera 31 and the lateral visual-detection camera 41 respectively transmit photographic data to the controlling module 12 for the controlling module 12 to determine whether the screw 50 is defective.

As shown in FIG. 14, the classifying assembly 13 comprises a first discharging slideway 131, a second discharging slideway 132 and an air-spraying classifying element 133. The first discharging slideway 131 and the second discharging slideway 132 are adjacent to a tail end of the carrying rail 21. The first discharging slideway 131 corresponds to the tail end of the carrying rail 21 in position. The second discharging slideway 132 is adjacent to the first discharging slideway 131. The air-spraying classifying element 133 is adjacent to the tail end of the carrying rail 21 and is connected to an external air source. The controlling module 12 is electrically connected to and controls the air-spraying classifying element 133. To be specific, the tail end of the carrying rail 21 is the discharging end 213 of the carrying rail 21.

If the controlling module 12 determines that the screw 50 is a normal screw without any defect, then when the normal screw is moved to the discharging end 213 of the carrying rail 21, the controlling module 12 controls the air-spraying classifying element 133 to spray air, pushing the normal screw to leave the carrying rail 21 and fall into the second discharging slideway 132. If the controlling module 12 determines that the screw 50 is a defective screw, then when the defective screw is moved to the discharging end 213 of the carrying rail 21, the defective screw leaves the carrying rail 21, and falls into the first discharging slideway 131, thereby classifying the screws 50 into the normal screw and the defective screw.

A conventional screw detection device uses a rotary disk to carry to-be-detected screws, so the screw-feeding device feeds the to-be-detected screws onto the rotating rotary disk. However, due to an effect of centrifugal force, a rotational speed of the rotary disk is limited. On the other hand, because the two guide-rail assemblies 211 of the carrying rail 21 of the carrying mechanism 20 are linear, the conveyance assembly 23 of the carrying mechanism 20 moves screws 50 on the two guide-rail assemblies 211 along the linear direction to process detection. So, compared to the conventional screw detection device, the screw detection device in accordance with the present invention does not need to consider the effect of centrifugal device, and hence a feeding speed of the screw-feeding device can be increased, thereby increasing a detection amount.

In addition, with reference to FIGS. 2, 3, 6 and 11, the space-adjusting assembly 22 is mounted at a bottom side of the installing plate 11 and comprises at least one space-adjusting slide rail 221, an adjusting driving element 222, an adjusting driven component 223 and two connecting bars 224. The at least one space-adjusting slide rail 221 is mounted on the installing plate and is perpendicular to the linear direction. The guide-rail seats 214 of the two guide-rail assemblies 211 are linearly movable on the at least one space-adjusting slide rail 221. The adjusting driven component 223 is connected between the adjusting driving element 222 and the two connecting bars 224. The two connecting bars 224 pass through the installing plate 11 and are respectively connected to the guide-rail seats 214 of the two guide-rail assemblies 211. The adjusting driving element 222 is electrically connected to and controlled by the controlling module 12. The adjusting driving element 222 drives the adjusting driven component 223 to move the two connecting bars 224, thereby moving the two guide-rail assemblies 211 toward and away from each other to adjust the space between the two guide-rail elements 215 to correspond to the screws 50 of different sizes. The adjusting driving element 222 is preferably a motor. Besides, the space-adjusting assembly 22 comprises a manually-adjusting element 225 connected to the adjusting driven component 223. Operating the manually-adjusting element 225 can manually adjust the two guide-rail elements 215.

Figure 6:
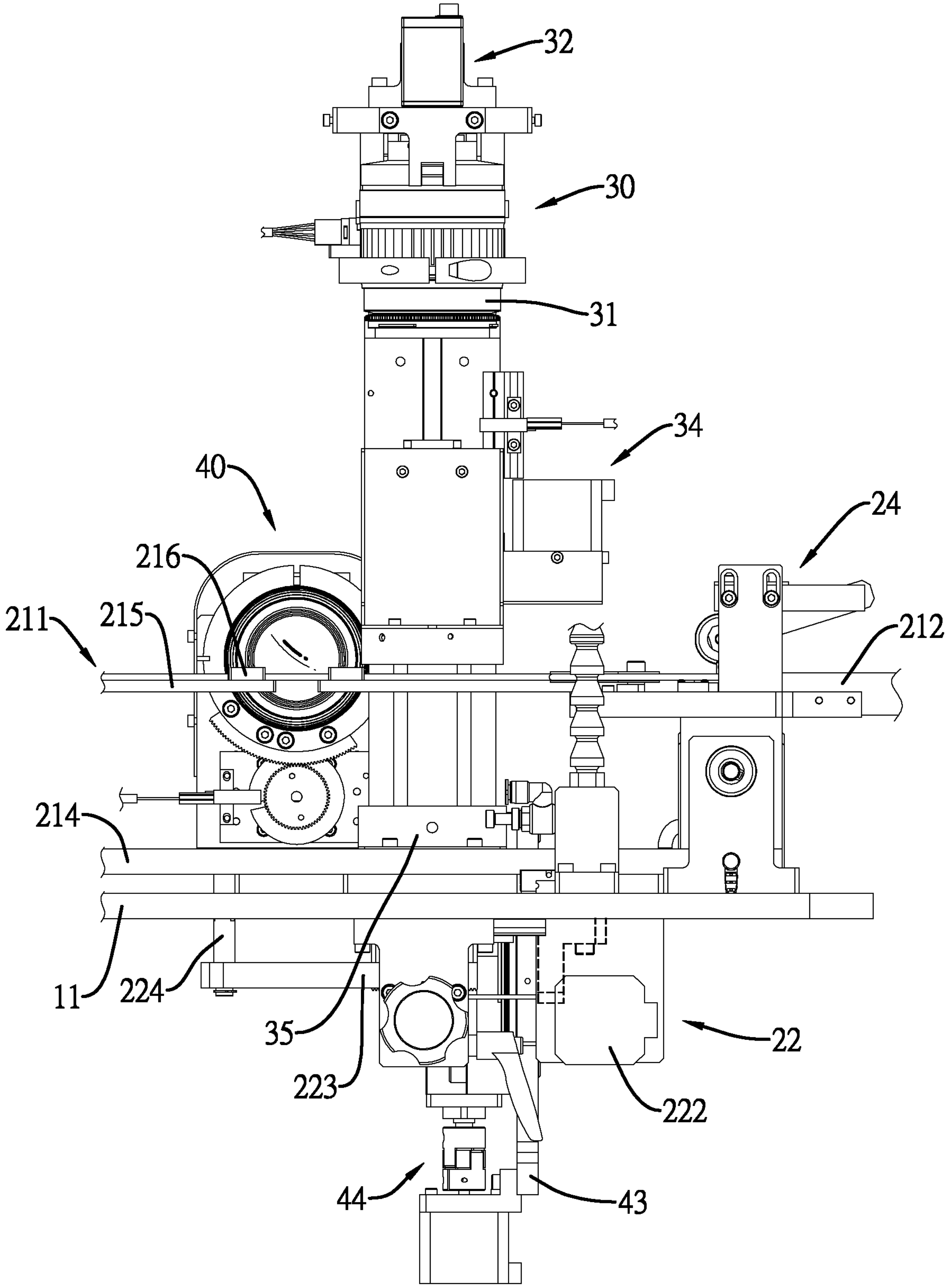
FIG. 6 is a partial front view of the interior of the device base of the screw detection device in accordance with the present invention.
Figure 7:
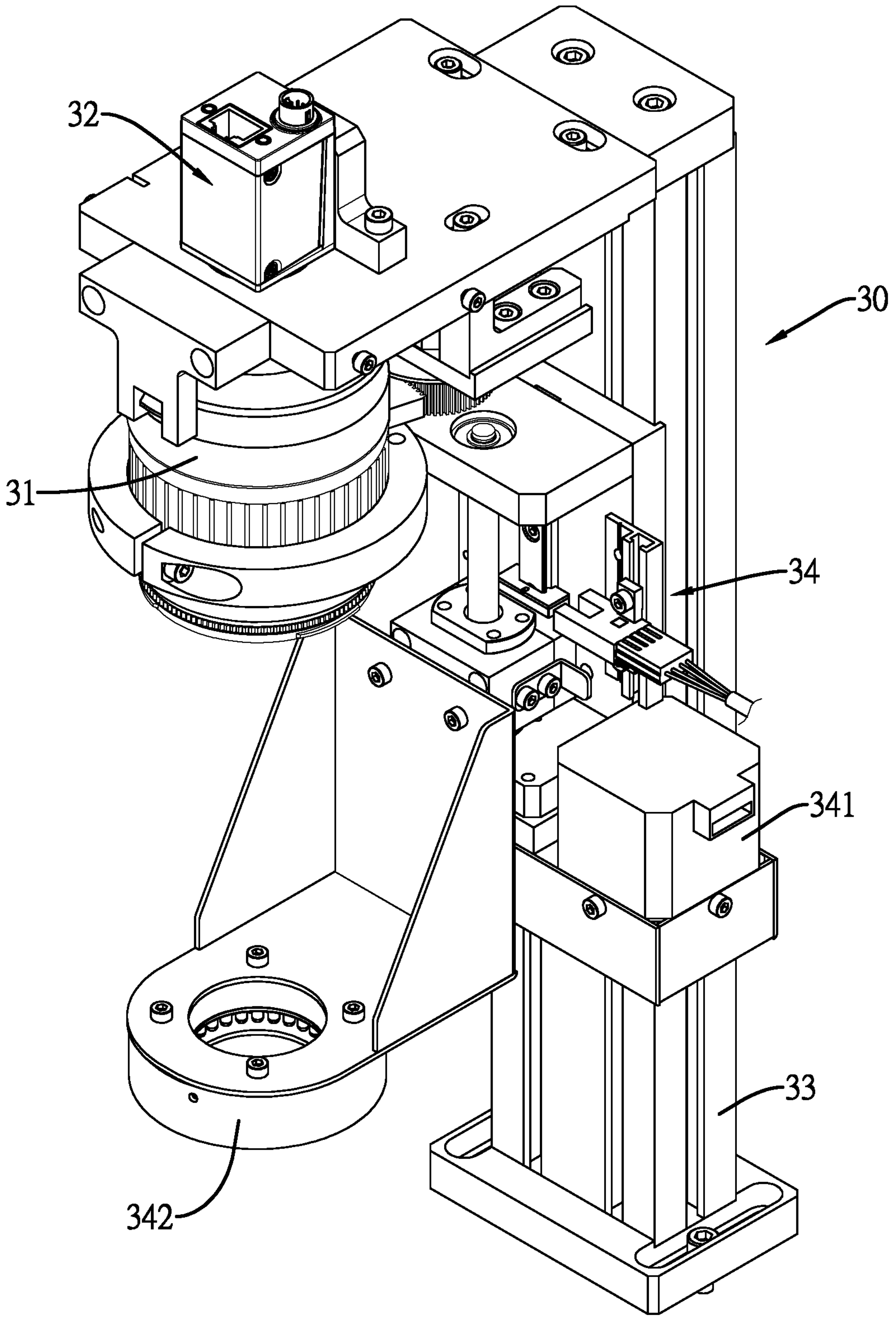
FIG. 7 is a perspective view of a top visual-detection mechanism of the screw detection device in accordance with the present invention.
Figure 8:
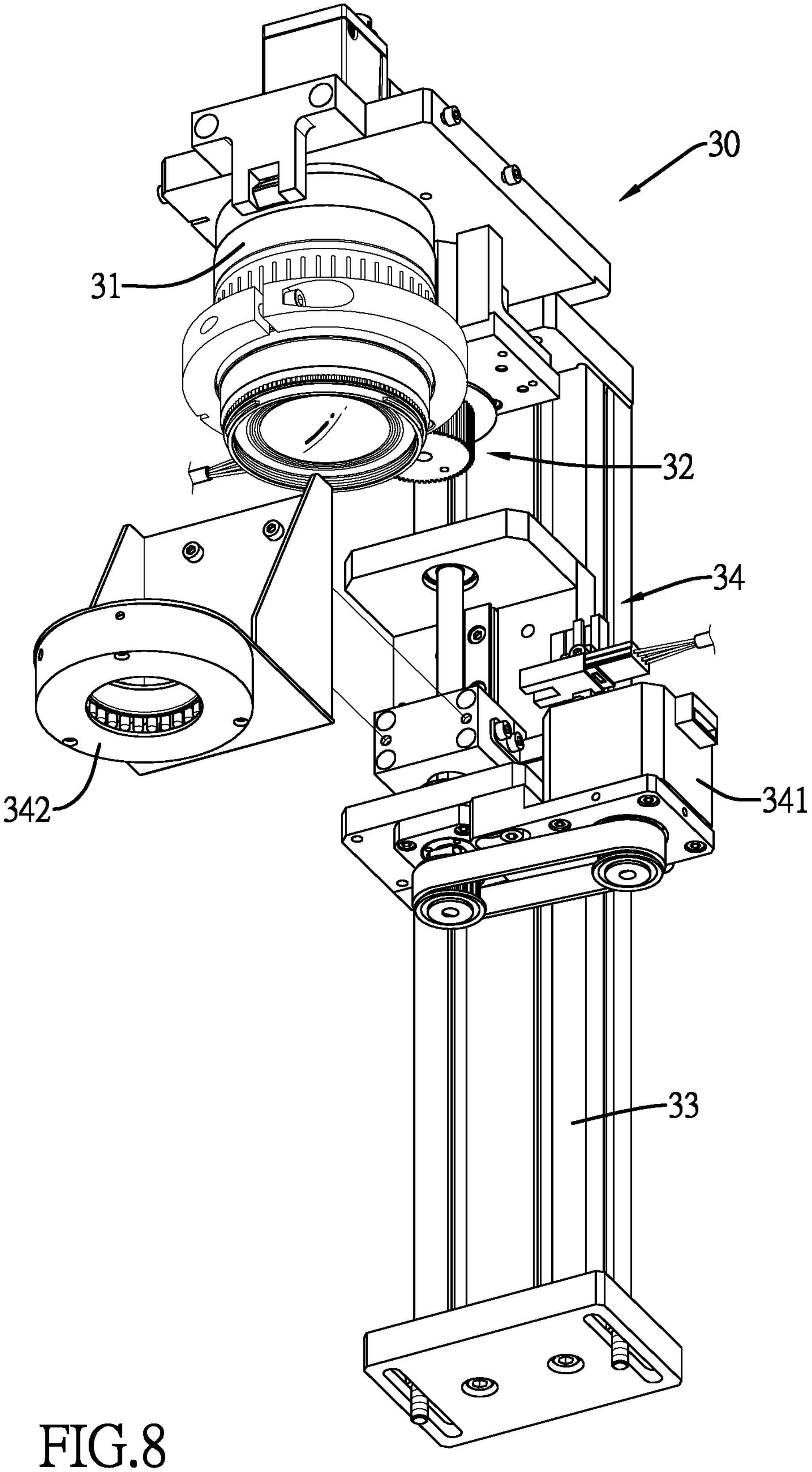
FIG. 8 is another perspective view of the top visual-detection mechanism of the screw detection device in accordance with the present invention.
Figure 9:
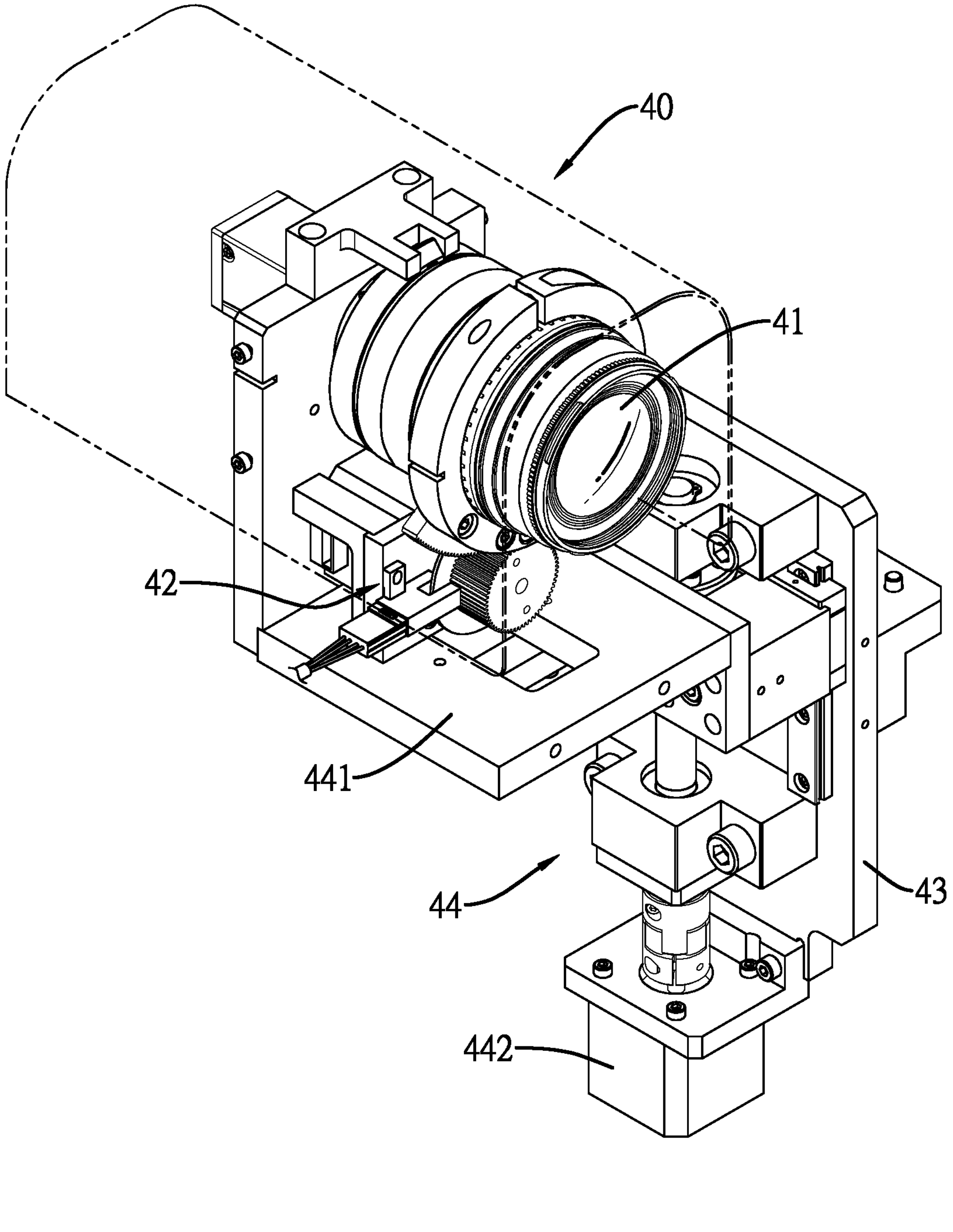
FIG. 9 is a perspective view of a lateral visual-detection mechanism of the screw detection device in accordance with the present invention.
Figure 10:
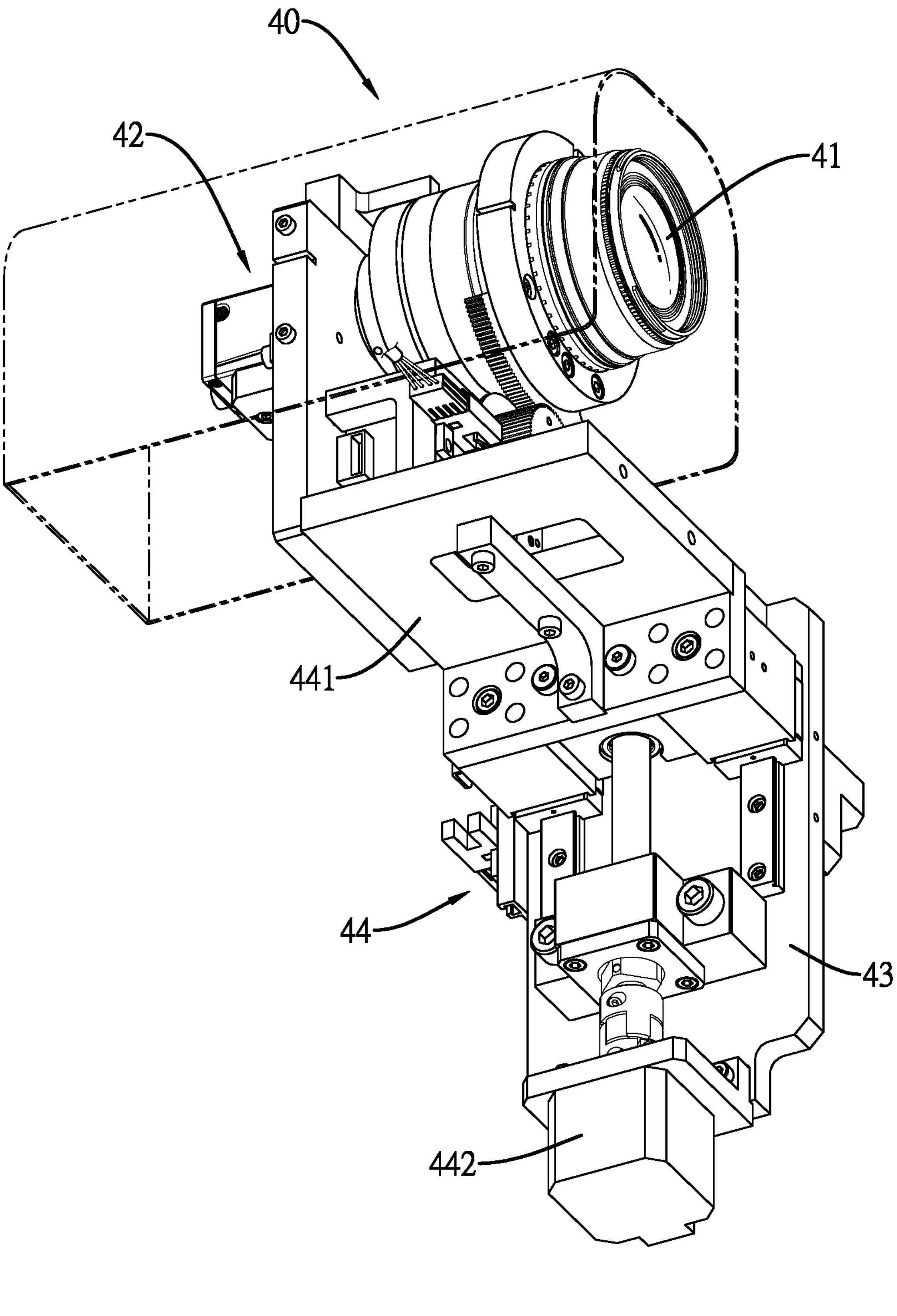
FIG. 10 is another perspective view of the lateral visual-detection mechanism of the screw detection device in accordance with the present invention.
Figure 11:
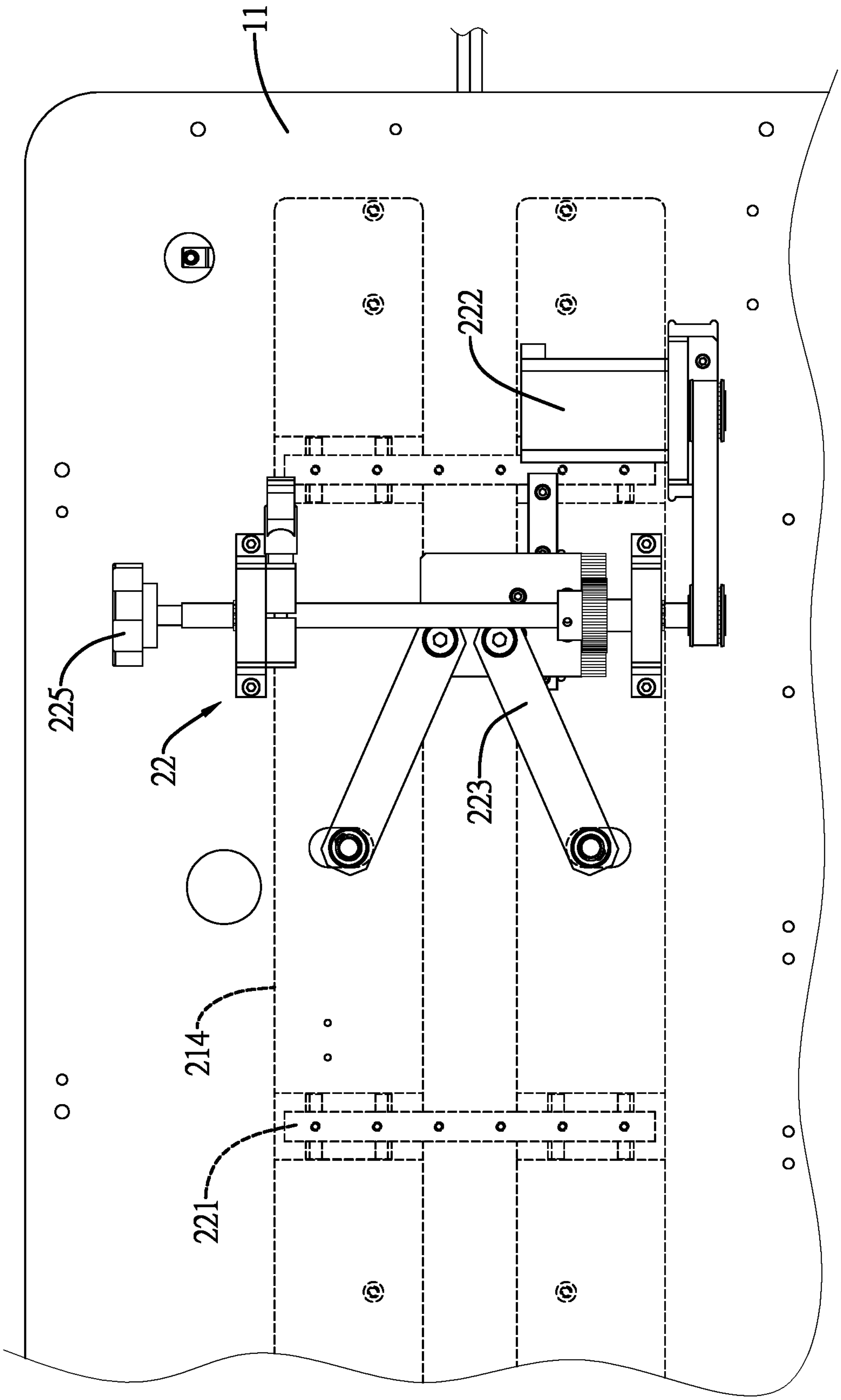
FIG. 11 is a bottom view of an installing plate and a carrying mechanism of the screw detection device in accordance with the present invention.

Additionally, as shown in FIGS. 6 to 8, the top visual-detection mechanism 30 comprises a top base seat 33, a top fill-light assembly 34 and a top back-light plate 35. The top base seat 33 is vertically mounted on the installing plate 11. The top visual-detection camera 31, the top focal-length-controlling assembly 32 and the top fill-light assembly 34 are mounted at the top base seat 33. The top fill-light assembly 34 comprises a top fill-light driving component 341 and a top fill-light element 342. The top fill-light driving component 341 is electrically connected to and controlled by the controlling module 12, and connects to and moves the top fill-light element 342 up and down. The top fill-light element 342 is disposed between the top visual-detection camera 31 and the two guide-rail assemblies 211 of the carrying rail 21. The top back-light plate 35 is mounted at the carrying rail 21, is disposed below the two guide-rail assemblies 211, and corresponds to the top visual-detection camera 31 in position.

As shown in FIGS. 2 to 4, 9 and 10, the lateral visual-detection mechanism 40 comprises a lateral base seat 43, a lateral camera-driving assembly 44 and a lateral back-light plate 45. The lateral base seat 43 is vertically mounted on the installing plate 11. The lateral camera-driving assembly 44 comprises a lateral camera pedestal 441 and a pedestal-driving element 442. The lateral camera pedestal 441 is up-and-down moveably mounted at the lateral base seat 43. The pedestal-driving element 442 is mounted at the lateral base seat 43 and is electrically connected to and controlled by the controlling module 12 to move the lateral camera pedestal 441. The lateral visual-detection camera 41 and the lateral focal-length-controlling assembly 42 are respectively mounted on the lateral camera pedestal 441. The lateral back-light plate 45 corresponds to the lateral visual-detection camera 41 in position. The lateral back-light plate 45 and the lateral visual-detection camera 41 are respectively disposed at two sides of the two guide-rail assemblies 211. The pedestal-driving element 442 is preferably a motor.

Additionally, the top back-light plate 35 is electrically connected to and controlled by the controlling module 12. The top fill-light element 342 and the top back-light plate 35 emit light to make the photograph of the screw 50 taken by the top visual-detection camera 31 clearer. The lateral back-light plate 45 is electrically connected to and controlled by the controlling module 12, and emits light to make the photograph of the screw 50 taken by the lateral visual-detection camera 41 clearer, thereby increasing detection accuracy.

The controlling module 12 controls the top focal-length-controlling assembly 32 to adjust the focal length of the top visual-detection camera 31, controls the top fill-light driving component 341 to move the top fill-light element 342 up and down, and controls the lateral focal-length-controlling assembly 42 to adjust the focal length of the lateral visual-detection camera 41. The controlling module 12 controls the pedestal-driving element 442 of the lateral camera-driving assembly 44 to move the lateral camera pedestal 441 up and down along the lateral base seat 43, thereby adjusting a height position of the lateral visual-detection camera 41.

When using the screw detection device to detect the screws 50 of different sizes, by presetting the adjusting parameters of the controlling module 12, the controlling module 12 automatically controls the carrying rail 21, the top visual-detection camera 31 and the lateral visual-detection camera 41 to meet detection needs of the screws 50 of different sizes. Therefore, manual adjustments are unnecessary, increasing convenience and reducing time spent on operations, and effectively reducing errors caused by adjusting device, hence increasing detection accuracy, and it is easier for manufacturers to determine whether a defective product is caused by errors of production.

Furthermore, the distance between the two guide-rail assemblies 211 can be adjusted through the space-adjusting assembly 22, so the carrying rail 21 can correspond to the screws 50 of different sizes, and rotary disks of different sizes are unnecessary, thereby lowering the costs. Besides, if one said screw detection device detects screws of a particular size, the controlling module 12 inside the device base 10 of said screw detection device records the adjusting parameters of the screws of the particular size. Then, the adjusting parameters can be provided to the controlling module 12 of another screw detection device for use. Therefore, different screw detection devices can share the adjusting parameters, so repeating detecting and recording is unnecessary, increasing convenience of use.

To sum up, the screw detection device is configured to detect the screws 50 of different sizes. By presetting the adjusting parameters of the controlling module 12, the controlling module 12 automatically controls the carrying rail 21, the top visual-detection camera 31 and the lateral visual-detection camera 41 to meet the detection needs of screws 50 of different sizes, and therefore manual adjustments are unnecessary. And by the linear carrying rail 21, the detection amount is increased.

Even though numerous characteristics and advantages of the present invention have been set forth in the foregoing description, together with details of the structure and features of the invention, the disclosure is illustrative only.

Changes may be made in the details, especially in matters of shape, size, and arrangement of parts within the principles of the invention to the full extent indicated by the broad general meaning of the terms in which the appended claims are expressed.

What is claimed is:

1. A screw detection device comprising:
a device base having
an installing plate;
a controlling module mounted inside the device base; and
a classifying assembly mounted on the installing plate and electrically connected to the controlling module;
a carrying mechanism mounted on the installing plate and comprising
a carrying rail having
two guide-rail assemblies extending along a linear direction and arranged parallelly;
a space-adjusting assembly connected to the two guide-rail assemblies and driving the two guide-rail assemblies toward and away from each other; and
a conveyance assembly cooperating with the carrying rail to move a screw on the two guide-rail assemblies along the linear direction toward the classifying assembly; the controlling module electrically connected to and controlling the space-adjusting assembly and the conveyance assembly;
a top visual-detection mechanism mounted on the installing plate and comprising
a top visual-detection camera disposed over the carrying rail and facing toward the carrying rail; and
a top focal-length-controlling assembly connected to the top visual-detection camera, electrically connected to and controlled by the controlling module, and adjusting a focal length of the top visual-detection camera;
a lateral visual-detection mechanism mounted on the installing plate and comprising
a lateral visual-detection camera disposed at a side of the carrying rail and facing toward the carrying rail; and
a lateral focal-length-controlling assembly connected to the lateral visual-detection camera, electrically connected to and controlled by the controlling module, and adjusting a focal length of the lateral visual-detection camera;
wherein the controlling module is electrically connected to the top visual-detection camera and the lateral visual-detection camera and controls the top visual-detection camera and the lateral visual-detection camera to photograph the screw, so that the controlling module determines whether the screw is defective and discards a defective screw through the classifying assembly;
wherein two ends of the carrying rail are respectively defined as a feeding end and a discharging end; the carrying rail has
a detecting area defined between the feeding end and the discharging end; the screw fed into the carrying rail through the feeding end and discharged from the discharging end; the classifying assembly adjacent to the discharging end; the top visual-detection camera and the lateral visual-detection camera respectively facing toward the detecting area of the carrying rail;
wherein the carrying mechanism comprises
a pressing assembly disposed at the feeding end of the carrying mechanism and comprising
a pressing seat mounted at the carrying rail;
a pressing arm; one end of the pressing arm swingably mounted at the pressing seat, another end of the pressing arm disposed over the two guide-rail assemblies and having
a pressing wheel;
an elastic element mounted between and abutting the pressing seat and the pressing arm.

2. The screw detection device as claimed in claim 1, wherein the conveyance assembly comprises
a conveyance driving set comprising
a conveyance driving element mounted at the installing plate and electrically connected to and controlled by the controlling module;
a conveyance link component connected to the conveyance driving element;
two driving wheels connected to the conveyance link component and respectively corresponding to the two guide-rail assemblies; and
two conveyance belts respectively mounted around the two driving wheels and respectively mounted around the two guide-rail assemblies; the conveyance driving set driving the two conveyance belts to operate.

3. The screw detection device as claimed in claim 2, wherein each one of the two guide-rail assemblies comprises
a guide-rail seat; and
a guide-rail element mounted on the guide-rail seat; each one of the two driving wheels mounted on the guide-rail seat of the corresponding guide-rail assembly; each one of the two conveyance belts mounted around the guide-rail element of the corresponding guide-rail assembly.

4. The screw detection device as claimed in claim 3, wherein each one of the two guide-rail assemblies comprises
multiple position-limited pieces mounted at the guide-rail element of said guide-rail assembly to limit the conveyance belt corresponding to said guide-rail assembly in position; and
multiple guiding wheels adjustably mounted at the guide-rail seat and disposed at two ends of the guide-rail element of said guide-rail assembly; each one of the two conveyance belts mounted around the multiple guiding wheels of the corresponding guide-rail assembly; the multiple guiding wheels abutting the corresponding conveyance belt.

5. The screw detection device as claimed in claim 1, wherein the space-adjusting assembly is mounted at a bottom side of the installing plate and comprises
at least one space-adjusting slide rail mounted on the installing plate and being perpendicular to the linear direction; the two guide-rail assemblies being linearly movable on the at least one space-adjusting slide rail;
an adjusting driving element;
an adjusting driven component; and
two connecting bars; the adjusting driven component connected between the adjusting driving element and the two connecting bars; the two connecting bars passing through the installing plate and respectively connected to the two guide-rail assemblies; the adjusting driving element electrically connected to and controlled by the controlling module, and driving the adjusting driven component.

6. The screw detection device as claimed in claim 4, wherein the space-adjusting assembly is mounted at a bottom side of the installing plate and comprises
at least one space-adjusting slide rail mounted on the installing plate and being perpendicular to the linear direction; the two guide-rail assemblies being linearly movable on the at least one space-adjusting slide rail;
an adjusting driving element;
an adjusting driven component; and
two connecting bars; the adjusting driven component connected between the adjusting driving element and the two connecting bars; the two connecting bars passing through the installing plate and respectively connected to the two guide-rail assemblies; the adjusting driving element electrically connected to and controlled by the controlling module, and driving the adjusting driven component.

7. The screw detection device as claimed in claim 1, wherein the top visual-detection mechanism comprises
a top base seat vertically mounted on the installing plate;
a top fill-light assembly comprising
a top fill-light driving component and a top fill-light element; the top visual-detection camera, the top focal-length-controlling assembly and the top fill-light assembly mounted at the top base seat; the top fill-light driving component electrically connected to and controlled by the controlling module, and connecting to and moving the top fill-light element up and down; the top fill-light element disposed between the top visual-detection camera and the two guide-rail assemblies of the carrying rail; and
a top back-light plate mounted at the carrying rail, disposed below the two guide-rail assemblies, and corresponding to the top visual-detection camera in position.

8. The screw detection device as claimed in claim 6, wherein the top visual-detection mechanism comprises
a top base seat vertically mounted on the installing plate;
a top fill-light assembly comprising
a top fill-light driving component and a top fill-light element; the top visual-detection camera, the top focal-length-controlling assembly and the top fill-light assembly mounted at the top base seat; the top fill-light driving component electrically connected to and controlled by the controlling module, and connecting to and moving the top fill-light element up and down; the top fill-light element disposed between the top visual-detection camera and the two guide-rail assemblies of the carrying rail; and
a top back-light plate mounted at the carrying rail, disposed below the two guide-rail assemblies, and corresponding to the top visual-detection camera in position.

9. The screw detection device as claimed in claim 1, wherein the lateral visual-detection mechanism comprises
a lateral base seat vertically mounted on the installing plate;
a lateral camera-driving assembly comprising
a lateral camera pedestal up-and-down moveably mounted at the lateral base seat; and
a pedestal-driving element mounted at the lateral base seat and electrically connected to and controlled by the controlling module to move the lateral camera pedestal;
the lateral visual-detection camera and the lateral focal-length-controlling assembly mounted on the lateral camera pedestal; and
a lateral back-light plate corresponding to the lateral visual-detection camera in position; the lateral back-light plate and the lateral visual-detection camera respectively disposed at two sides of the two guide-rail assemblies.

10. The screw detection device as claimed in claim 8, wherein the lateral visual-detection mechanism comprises
a lateral base seat vertically mounted on the installing plate;
a lateral camera-driving assembly comprising
a lateral camera pedestal up-and-down moveably mounted at the lateral base seat; and
a pedestal-driving element mounted at the lateral base seat and electrically connected to and controlled by the controlling module to move the lateral camera pedestal; the lateral visual-detection camera and the lateral focal-length-controlling assembly mounted on the lateral camera pedestal; and
a lateral back-light plate corresponding to the lateral visual-detection camera in position; the lateral back-light plate and the lateral visual-detection camera respectively disposed at two sides of the two guide-rail assemblies.

11. The screw detection device as claimed in claim 1, wherein the classifying assembly comprises
a first discharging slideway corresponding to a tail end of the carrying rail in position;
a second discharging slideway adjacent to the first discharging slideway; the first discharging slideway and the second discharging slideway adjacent to the tail end of the carrying rail; and
an air-spraying classifying element adjacent to the tail end of the carrying rail and connected to an external air source; the controlling module electrically connected to and controlling the air-spraying classifying element.

12. The screw detection device as claimed in claim 10, wherein the classifying assembly comprises
a first discharging slideway corresponding to a tail end of the carrying rail in position;
a second discharging slideway adjacent to the first discharging slideway; the first discharging slideway and the second discharging slideway adjacent to the tail end of the carrying rail; and
an air-spraying classifying element adjacent to the tail end of the carrying rail and connected to an external air source; the controlling module electrically connected to and controlling the air-spraying classifying element.

* * * * *